US 8,267,207 B2

(12) United States Patent
Ichikawa

(10) Patent No.: US 8,267,207 B2
(45) Date of Patent: Sep. 18, 2012

(54) POWER SUPPLY SYSTEM AND VEHICLE INCLUDING THE SAME

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 842 days.

(21) Appl. No.: 12/227,850

(22) PCT Filed: Jun. 7, 2007

(86) PCT No.: PCT/JP2007/061962
§ 371 (c)(1),
(2), (4) Date: Dec. 1, 2008

(87) PCT Pub. No.: WO2007/148592
PCT Pub. Date: Dec. 27, 2007

(65) Prior Publication Data
US 2009/0145675 A1    Jun. 11, 2009

(30) Foreign Application Priority Data

Jun. 23, 2006   (JP) .................................. 2006-174113

(51) Int. Cl.
*H01M 10/44* (2006.01)
(52) U.S. Cl. ...................................... 180/65.1; 320/124
(58) Field of Classification Search ................. 180/65.1, 180/65.29, 65.31; 320/104, 124; 318/139
See application file for complete search history.

(56) References Cited

U.S. PATENT DOCUMENTS

| 3,576,487 A * | 4/1971 | Chase ........................... 320/139 |
| 3,786,342 A * | 1/1974 | Molyneux ...................... 324/429 |
| 4,489,242 A * | 12/1984 | Worst ........................... 307/10.1 |
| 5,640,078 A * | 6/1997 | Kou et al. ...................... 320/124 |
| 5,710,504 A * | 1/1998 | Pascual et al. ............... 180/65.8 |
| 5,780,980 A | 7/1998 | Naito |
| 5,821,734 A * | 10/1998 | Faulk ............................ 320/124 |
| 5,969,624 A * | 10/1999 | Sakai et al. ................. 340/636.1 |
| 6,608,396 B2 | 8/2003 | Downer et al. |
| 6,710,575 B2 | 3/2004 | Youn |
| 6,835,491 B2 * | 12/2004 | Gartstein et al. ................ 429/92 |
| 7,002,263 B2 | 2/2006 | Inn et al. |
| 7,075,194 B2 * | 7/2006 | Weidenheimer et al. ....... 307/71 |
| 7,420,374 B2 * | 9/2008 | Chen ............................. 324/427 |

(Continued)

FOREIGN PATENT DOCUMENTS

JP         A-08-289410         11/1996

(Continued)

OTHER PUBLICATIONS

Jan. 15, 2010 Office Action issued in Russian Application No. 2009102051/09(002582).

(Continued)

*Primary Examiner* — Frank Vanaman
(74) *Attorney, Agent, or Firm* — Oliff & Berridge, PLC

(57) ABSTRACT

A hysteresis characteristic unit switches between outputs of selection instructions in accordance with a status characteristic depending on a present selection state (history). Specifically, the hysteresis characteristic unit makes determination of switching in accordance with the status characteristic if the selection instruction has been selected, and makes determination of switching in accordance with the status characteristic if the selection instruction has been selected. If a charge/discharge voltage is lower than a charge/discharge voltage by an amount exceeding a switching threshold voltage, switching from the selection instruction to the selection instruction is made.

11 Claims, 10 Drawing Sheets

U.S. PATENT DOCUMENTS

| | | |
|---|---|---|
| 2003/0107352 A1 | 6/2003 | Downer et al. |
| 2005/0275290 A1 | 12/2005 | Inn et al. |

FOREIGN PATENT DOCUMENTS

| | | |
|---|---|---|
| JP | A-2000-235065 | 8/2000 |
| JP | A-2002-291247 | 10/2002 |
| JP | A-2003-209969 | 7/2003 |
| JP | A-2003-309997 | 10/2003 |
| JP | A-2004-147477 | 5/2004 |
| JP | A-2005-354894 | 12/2005 |
| JP | A-2006-014506 | 1/2006 |
| RU | 2 025 862 C1 | 12/1994 |
| WO | WO 2005/105511 A1 | 11/2005 |

OTHER PUBLICATIONS

Korean Office Action for corresponding Korean Patent Application No. 10-2009-7001174, mailed on Aug. 31, 2010 (w/ English translation).

* cited by examiner

POWER SUPPLY SYSTEM AND VEHICLE INCLUDING THE SAME

TECHNICAL FIELD

The present invention relates to a power supply system having a plurality of power storage units and a vehicle including the same, and particularly to a technique to select any one of the two power storage units for use.

BACKGROUND ART

Recently, considering environmental issues, attention has been paid to a vehicle employing a motor as a drive force source, such as an electric vehicle, a hybrid vehicle and a fuel cell vehicle. Such a vehicle includes a power storage unit implemented, for example, by a secondary battery or a capacitor for supplying electric power to the motor, and converting kinetic energy to electric energy during regenerative braking and storing such electric power.

In such a vehicle employing the motor as the drive force source, in order to enhance acceleration performance and running performance such as travel distance, greater charge/discharge capacity of the power storage unit is desired. Here, a configuration where a plurality of power storage units are mounted has been proposed as a method of increasing the charge/discharge capacity of the power storage unit.

For example, U.S. Pat. No. 6,608,396 discloses a power control system providing desired high DC voltage levels required by a high voltage vehicle traction system. The power control system includes a plurality of power stages for providing DC power to at least one inverter, each stage including a battery and boost/buck DC-DC converter, the power stages wired in parallel, and a controller controlling the plurality of power stages so as to maintain a voltage output to at least one inverter by causing uniform charge/discharge of the batteries of the plurality of power stages.

On the other hand, the drive force required in the vehicle significantly varies depending on a state of running. For example, during running at low speed or running down a slope, required electric power is small relative to the total value of allowable charge/discharge power in a plurality of power storage units. Then, in such a case, desirably, a voltage conversion operation of a voltage conversion unit (corresponding to the boost/buck DC-DC converter above) corresponding to a prescribed power storage unit is selectively stopped so that loss in electric power conversion in the voltage conversion unit is decreased.

In selectively stopping such a voltage conversion unit, a voltage conversion unit to be stopped is selected by reflecting a power storage state of the corresponding power storage unit. For example, a voltage conversion unit to be stopped is selected depending on magnitude of an output voltage of the power storage unit connected to each voltage conversion unit. Namely, a voltage conversion unit corresponding to a power storage unit smaller in an output voltage is preferentially stopped, so that generation of an unnecessary cyclic current between the power storage units is avoided.

In a power supply system having two power storage units relatively close to each other in capacity, an output voltage of each power storage unit can have a relatively close value. Accordingly, if a voltage conversion unit to be stopped is selected simply based on magnitude of the output voltage of the power storage unit, switching between the voltage conversion units to be stopped is made frequently and a supply voltage from the voltage conversion unit to a load device becomes unstable. In addition, each voltage conversion unit should repeat stop and execution of a voltage conversion operation so frequently that a control system involved with the voltage conversion operation becomes unstable.

DISCLOSURE OF THE INVENTION

The present invention was made to solve such problems, and an object of the present invention is to provide a power supply system achieving improved stability of an operation mode allowing only one voltage conversion unit out of two voltage conversion units to perform a voltage conversion operation, and a vehicle including the same.

According to one aspect of the present invention, a power supply system having a plurality of power storage units each configured to be capable of charge and discharge includes: a power line configured to be capable of supplying and receiving electric power between a load device and the power supply system; a plurality of voltage conversion units provided between respective ones of the plurality of power storage units and the power line, each performing a voltage conversion operation between the corresponding power storage unit and the power line; an operation mode selection unit selecting an operation mode in which a voltage conversion operation of one voltage conversion unit out of first and second voltage conversion units included in the plurality of voltage conversion units is allowed and a voltage conversion operation of another voltage conversion unit is stopped, in accordance with an electric power request from the load device; and a voltage conversion unit selection unit selecting the voltage conversion unit to be allowed to perform the voltage conversion operation based on output voltages of respective corresponding power storage units, when the operation mode is selected. The voltage conversion unit selection unit switches between the voltage conversion units to be allowed to perform the voltage conversion operation, when the output voltage of the power storage unit corresponding to the voltage conversion unit being performing the voltage conversion operation is lower than the output voltage of the power storage unit corresponding to the voltage conversion unit of which voltage conversion operation has been stopped by an amount exceeding a prescribed threshold voltage.

According to the present invention, the operation mode in which one voltage conversion unit out of the first and second voltage conversion units included in the plurality of voltage conversion units is allowed to perform the voltage conversion operation and the voltage conversion operation of another voltage conversion unit is stopped is selected in accordance with the electric power request from the load device. In this operation mode, when the output voltage of the power storage unit corresponding to the voltage conversion unit being performing the voltage conversion operation is lower than the output voltage of the power storage unit corresponding to the voltage conversion unit of which voltage conversion operation is stopped by an amount exceeding a prescribed threshold voltage, switching between the voltage conversion units to be allowed to perform the voltage conversion operation is made. Thus, as compared with such a configuration that switching between the voltage conversion units is made directly in accordance with magnitude of the output voltages of the power storage units, too frequent switching operation between the voltage conversion units is less likely. Therefore, the supply voltage to the load device or the control system involved with the voltage conversion operation can be prevented from becoming unstable.

Preferably, the voltage conversion unit selection unit selects, as initial selection in the operation mode, the voltage conversion unit corresponding to the power storage unit greater in the output voltage out of the respective corresponding power storage units.

In addition, preferably, the switching threshold voltage is decided in accordance with a status value associated with a degree of fluctuation in the output voltage of the power storage unit.

Further preferably, the switching threshold voltage is changed in accordance with a temperature, an internal resistance, a degree of deterioration, or a remaining capacity of at least one of the power storage units corresponding to the respective first and second voltage conversion units.

Further preferably, the switching threshold voltage is changed in accordance with an output current of the power storage unit corresponding to the voltage conversion unit being performing the voltage conversion operation.

In addition, the present invention is directed to a vehicle including the power supply system according to the present invention described above, and a drive force generation unit generating drive force by receiving electric power supplied from the power supply system.

According to the present invention, a power supply system achieving improved stability of an operation mode allowing only one voltage conversion unit out of two voltage conversion units to perform a voltage conversion operation, and a vehicle including the same can be achieved.

BEST MODES FOR CARRYING OUT THE INVENTION

Figure 1:
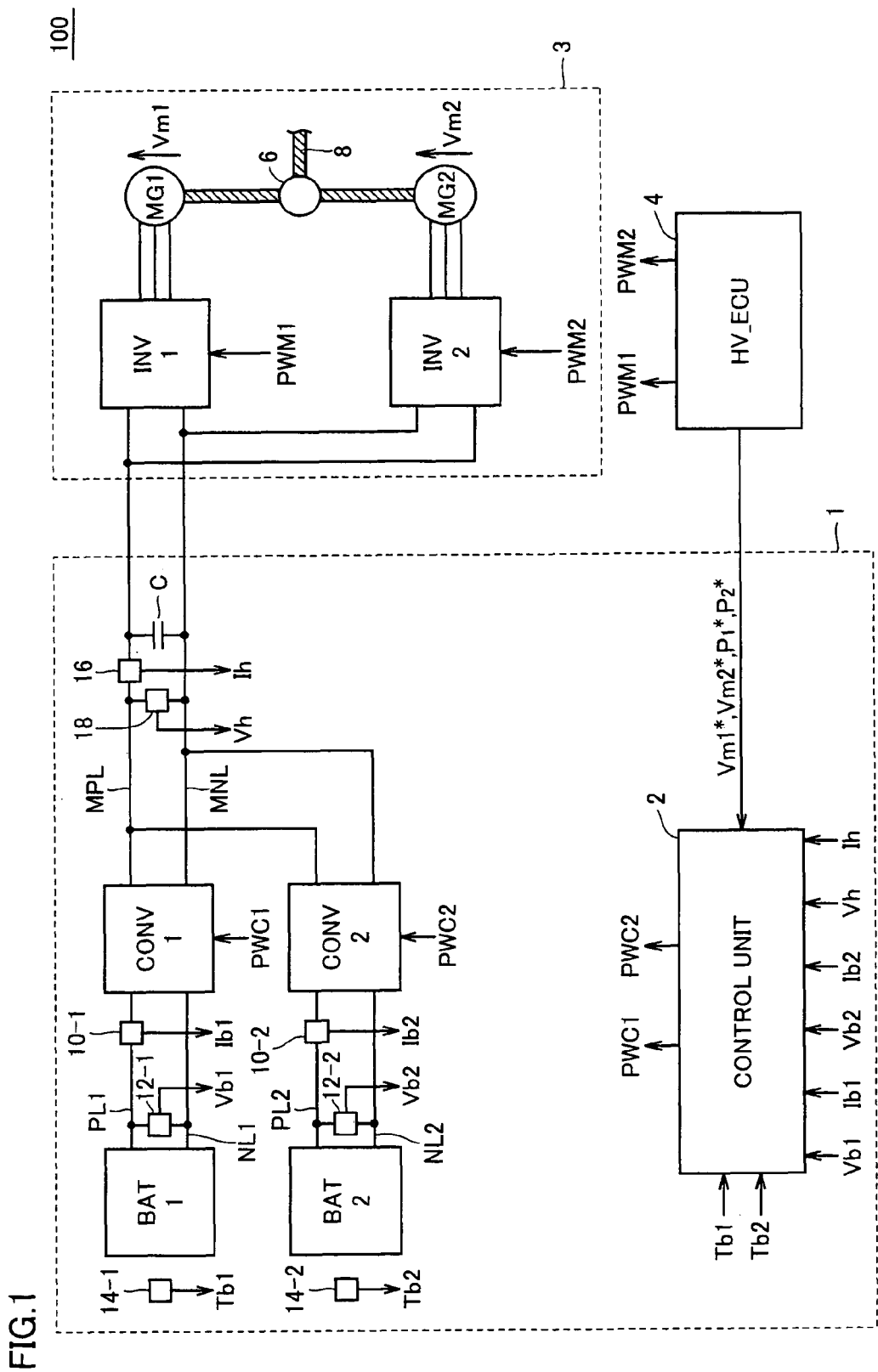
FIG. 1 is a schematic configuration diagram showing a substantial part of a vehicle including a power supply system according to an embodiment of the present invention.

An embodiment of the present invention will be described in detail with reference to the drawings. The same or corresponding elements in the drawings have the same reference characters allotted, and therefore detailed description thereof will not be repeated.

FIG. 1 is a schematic configuration diagram showing a substantial part of a vehicle 100 including a power supply system 1 according to an embodiment of the present invention.

Referring to FIG. 1, in the present embodiment, a configuration in which electric power is supplied and received to and from a drive force generation unit 3 for generating drive force of vehicle 100 is illustrated as an example of a load device. Vehicle 100 runs by transmitting to wheels (not shown), drive force generated by drive force generation unit 3 by receiving the electric power supplied from power supply system 1.

In the present embodiment, power supply system 1 including two power storage units as an example of a plurality of power storage units will be described. Power supply system 1 supplies/receives DC power to/from drive force generation unit 3 through a main positive bus MPL and a main negative bus MNL.

Drive force generation unit 3 includes a first inverter INV1, a second inverter INV2, a first motor-generator MG1, and a second motor-generator MG2, and generates drive force in accordance with switching instructions PWM1, PWM2 from an HV_ECU (Hybrid Vehicle Electronic Control Unit) 4.

Inverters INV1, INV2 are connected in parallel to main positive bus MPL and main negative bus MNL, and supply/receive electric power to/from power supply system 1. That is, inverters INV1, INV2 convert DC power received through main positive bus MPL and main negative bus MNL to AC power and supply the AC power to motor-generators MG1, MG2 respectively. In addition, inverters INV1, INV2 may be configured to convert AC power generated by motor-generators MG1, MG2 by receiving kinetic energy of vehicle 100 to DC power and return the resultant DC power as the regenerative power to power supply system 1 in regenerative braking or the like of vehicle 100. For example, inverters INV1, INV2 are constituted of a bridge circuit including switching elements of three phases, and generate three-phase AC power by performing a switching (circuit opening/closing) operation in response to switching instructions PWM1, PWM2 received from HV_ECU 4.

Motor-generators MG1, MG2 are configured to be able to generate rotational drive force by receiving AC power supplied from inverters INV1, IUV2 respectively and to be able to generate AC power by receiving external rotational drive force. For example, motor-generators MG1, MG2 are implemented by a three-phase AC electric rotating machine including a rotor having permanent magnets embedded. Motor-generators MG1, MG2 are coupled to a power split device 6, so as to transmit the generated drive force to wheels (not shown) via a drive shaft 8.

If drive force generation unit 3 is applied to a hybrid vehicle, motor-generators MG1, MG2 are also mechanically coupled to an engine (not shown) through power split device 6 or drive shaft 8. Then, HV_ECU 4 carries out control such that an optimal ratio between the drive force generated by the engine and the drive force generated by motor-generators MG1, MG2 is attained. If drive force generation unit 3 is applied to such a hybrid vehicle, one motor-generator may serve solely as the motor, while another motor-generator may serve solely as the generator.

HV_ECU 4 executes a program stored in advance, so as to calculate torque target values and speed target values of motor-generators MG1, MG2, based on a signal transmitted from each not-shown sensor, a running state, variation in an accelerator position, a stored map, or the like. Then, HV_ECU 4 generates switching instructions PWM1, PWM2 and provides the same to drive force generation unit 3 such that generated torque and speed of motor-generators MG1, MG2 attain the torque target values and the speed target values respectively.

In addition, HV_ECU 4 obtains counterelectromotive forces Vm1, Vm2 generated in respective motor-generators MG1, MG2 based on the calculated torque target values and the speed target values or on an actual torque value and an actual speed value detected by not-shown various sensors, and outputs voltage requests Vm1*, Vm2* decided based on counterelectromotive forces Vm1, Vm2 to power supply system 1. Namely, HV_ECU 4 decides a voltage greater than counterelectromotive force Vm1, Vm2 as voltage request Vm1*, Vm2* so that electric power can be supplied from power supply system 1 to motor-generator MG1, MG2.

Moreover, HV_ECU 4 calculates electric power request P1*, P2* based on the product of the torque target value and the speed target value or on the product of the actual torque value and the actual speed value and outputs the electric power request to power supply system 1. It is noted here that, by changing the sign of electric power request P1*, P2*, HV_ECU 4 transmits a supply/demand state of electric power in drive force generation unit 3, such as power consumption (positive value) or power regeneration (negative value), to power supply system 1.

Meanwhile, power supply system 1 includes a smoothing capacitor C, a supply current detection unit 16, a supply voltage detection unit 18, a first converter CONV1, a second converter CONV2, a first power storage unit BAT1, a second power storage unit BAT2, output current detection units 10-1, 10-2, output voltage detection units 12-1, 12-2, power-storage-unit-temperature detection units 14-1, 14-2, and a control unit 2.

Smoothing capacitor C is connected between main positive bus MPL and main negative bus MNL, and reduces a fluctuation component (AC component) contained in electric power supplied from converter CONV1, CONV2.

Supply current detection unit 16 is representatively inserted in main positive bus MPL in series, detects a supply current Ih to drive force generation unit 3, and outputs the result of detection to control unit 2.

Supply voltage detection unit 18 is connected between main positive bus MPL and main negative bus MNL, detects a supply voltage Vh to drive force generation unit 3, and outputs the result of detection to control unit 2.

Converters CONV1, CONV2 are connected to main positive bus MPL and main negative bus MNL in parallel, and perform a voltage conversion operation between respective corresponding power storage units BAT1, BAT2 and main positive bus MPL, main negative bus MNL. More specifically, converters CONV1, CONV2 boost the discharge power from power storage units BAT1, BAT2 to a target voltage and generate supply electric power. For example, converters CONV1, CONV2 are configured to include a chopper circuit.

Power storage units BAT1, BAT2 are connected in parallel to main positive bus MPL and main negative bus MNL with converters CONV1, CONV2 being interposed respectively. For example, power storage unit BAT1, BAT2 is implemented by a secondary battery configured to be capable of charge/discharge, such as a nickel metal hydride battery or a lithium-ion battery, or by a power storage element such as an electric double layer capacitor.

Output current detection units 10-1, 10-2 are inserted in one line of a pair of power lines connecting power storage units BAT1, BAT2 to converters CONV1, CONV2 respectively, detect output currents Ib1, Ib2 involved with input and output of power storage units BAT1, BAT2 respectively, and output the result of detection to control unit 2.

Output voltage detection units 12-1, 12-2 are connected between a pair of power lines connecting power storage units BAT1, BAT2 to converters CONV1, CONV2 respectively, detect output voltages Vb1, Vb2 of power storage unites BAT1, BAT2 respectively, and output the result of detection to control unit 2.

Power-storage-unit-temperature detection units 14-1, 14-2 are arranged in the proximity of battery cells and the like constituting power storage units BAT1, BAT2 respectively, detect power storage unit temperatures Tb1, Tb2 which represent internal temperatures of power storage units BAT1, BAT2, and output the result of detection to control unit 2. It is noted that power-storage-unit-temperature detection units 14-1, 14-2 may be configured to output a representative value obtained for example by averaging processing, based on the result of detection by a plurality of detection elements arranged in correspondence with a plurality of battery cells constituting power storage units BAT1, BAT2, respectively.

Control unit 2 generates switching instructions PWC1, PWC2 in accordance with a control structure which will be described later, based on voltage request Vm1*, Vm2* and electric power request P1*, P2* received from HV_ECU 4, supply current Ih received from supply current detection unit 16, supply voltage Vh received from supply voltage detection unit 18, output current Ib1, Ib2 received from output current detection unit 10-1, 10-2, output voltage Vb1, Vb2 received from output voltage detection unit 12-1, 12-2, and power storage unit temperature Tb1, Tb2 received from power-storage-unit-temperature detection unit 14-1, 14-2, and controls the voltage conversion operation of converter CONV1, CONV2.

In particular, control unit 2 selectively executes the operation mode in which the voltage conversion operation of one converter out of converters CONV1 and CONV2 is allowed and the voltage conversion operation of another converter is stopped (hereinafter, also referred to as the "one-side stop mode"), in accordance with electric power request P1*, P2* from drive force generation unit 3. Namely, if the total value of electric power requests P1*, P2* from drive force generation unit 3 is smaller than allowable charge/discharge power of power storage unit BAT1 or BAT2, control unit 2 stops the voltage conversion operation of one converter and thus decreases power conversion loss.

Specifically, control unit 2 selects, as initial selection in the one-side stop mode, the converter corresponding to the power storage unit greater in the output voltage out of power storage units BAT1 and BAT2, and allows that converter to perform the voltage conversion operation, in order to suppress generation of an unnecessary cyclic current between the power storage units and to avoid abnormal deterioration or unnecessary loss of the power storage unit. In other words, if the output voltage of the power storage unit connected to the converter of which voltage conversion operation has been stopped is greater than the output voltage of another power storage unit, an unnecessary cyclic current that flows back through the converter of which voltage conversion operation has been stopped is produced.

In addition, control unit 2 switches between the converters that should perform the voltage conversion operation, when the output voltage of the power storage unit corresponding to the converter being performing the voltage conversion operation is lower than the output voltage of the power storage unit corresponding to the converter of which voltage conversion operation has been stopped by an amount exceeding the prescribed threshold voltage. Namely, control unit 2 has a hysteresis characteristic defined by a switching threshold voltage, with regard to determination of switching between converters in the one-side stop mode.

The switching threshold voltage is decided in accordance with a status value associated with a degree of fluctuation in the output voltage of the power storage unit. As will be described later, power storage unit temperature Tb1, Tb2, output current Ib1, Ib2, an internal resistance of power storage unit BAT1, BAT2, a degree of deterioration of power storage unit BAT1, BAT2, a remaining capacity (SOC: State Of Charge) of power storage unit BAT1, BAT2, and the like are used as a status value deciding such a switching threshold voltage.

Moreover, a first switching threshold voltage used for determination of switching from converter CONV1 to converter CONV2 and a second switching threshold voltage used for determination of switching from converter CONV2 to converter CONV1 may be set as the switching threshold voltage described above, independently of each other.

Here, as described above, in order for a discharge current from the power storage unit to flow back through the converter of which voltage conversion operation has been stopped, the discharge voltage of the power storage unit must be higher than the output voltage of another power storage unit by an amount exceeding a prescribed voltage. Therefore, even though the configuration is such that the hysteresis characteristic is exhibited, a disadvantageous cyclic current is almost unlikely.

In the embodiment of the present invention, drive force generation unit 3 corresponds to the "load device", main positive bus MPL and main negative bus MNL correspond to the "power line", and converters CONV1, CONV2 correspond to the "plurality of voltage conversion units." In addition, control unit 2 corresponds to the "operation mode selection unit" and the "voltage conversion unit selection unit."

Figure 2:
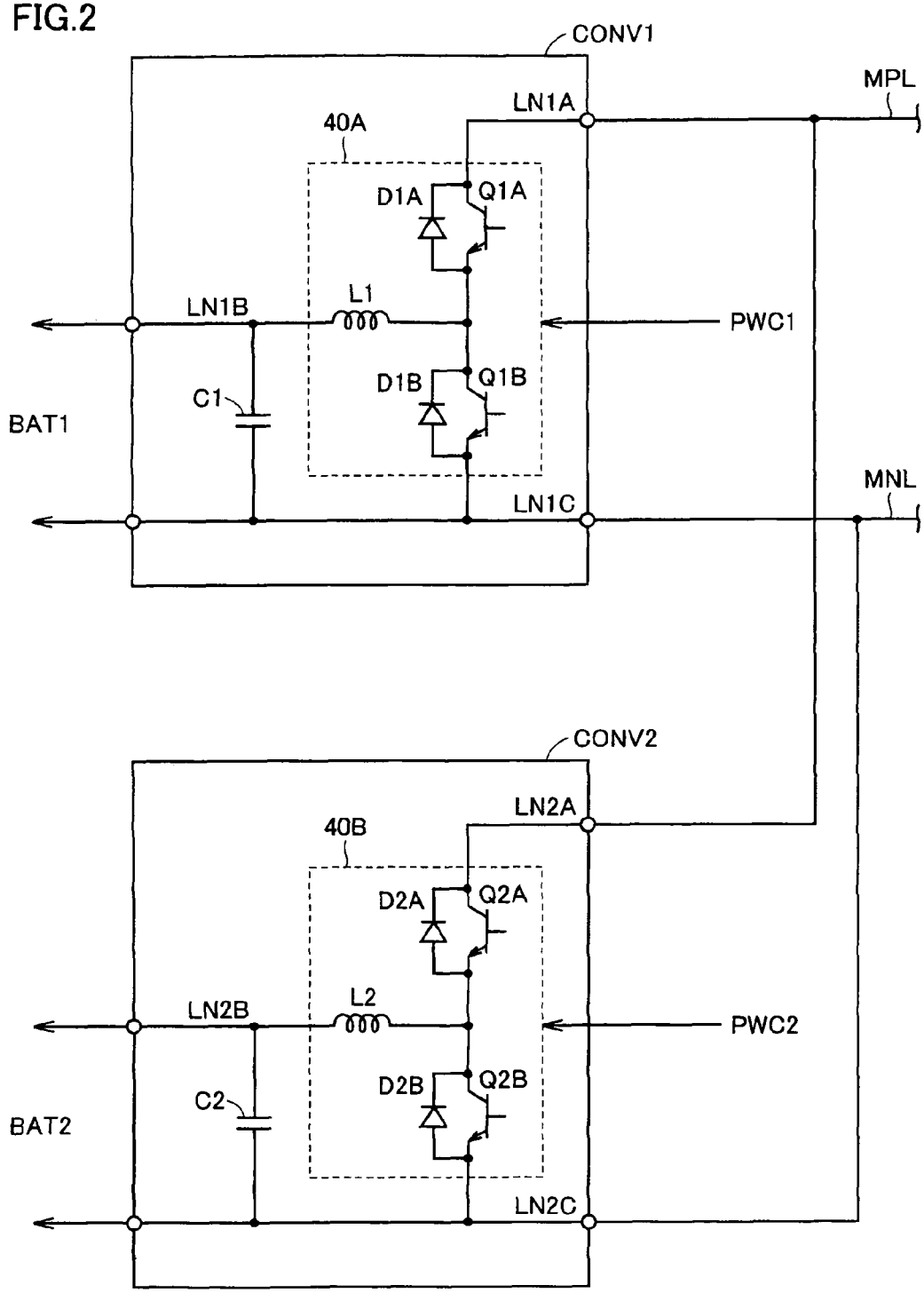
FIG. 2 is a schematic configuration diagram of a converter according to the embodiment of the present invention.

FIG. 2 is a schematic configuration diagram of converters CONV1, CONV2 according to the embodiment of the present invention.

Referring to FIG. 2, converter CONV1 is constituted of a chopper circuit 40A and a smoothing capacitor C1.

Chopper circuit 40A is capable of bidirectional supply of electric power. Specifically, in response to switching instruction PWC1 from control unit 2 (FIG. 1), chopper circuit 40A is capable of boosting the electric power discharged from power storage unit BAT1 to supply the resultant power to drive force generation unit 3 (FIG. 1), while chopper circuit 40A is capable of bucking the regenerative power received from drive force generation unit 3 to supply the resultant power to power storage unit BAT1. In addition, chopper circuit 40A includes a positive bus LN1A, a negative bus LN1C, a line LN1B, transistors Q1A, Q1B representing a switching element, diodes D1A, D1B, and an inductor L1.

Positive bus LN1A has one end connected to a collector of transistor Q1A and the other end connected to main positive bus MPL. In addition, negative bus LN1C has one end connected to a negative side of power storage unit BAT1 and the other end connected to main negative bus MNL.

Transistors Q1A, Q1B are connected in series between positive bus LN1A and negative bus LN1C. Transistor Q1A has the collector connected to positive bus LN1A and transistor Q1B has an emitter connected to negative bus LN1C. In addition, diodes D1A, D1B allowing current flow from the emitter side to the collector side are connected between the collectors and the emitters of transistors Q1A, Q1B respectively. Further, inductor L1 is connected to a connection point of transistor Q1A and transistor Q1B.

Line LN1B has one end connected to the positive side of power storage unit BAT1 and the other end connected to inductor L1.

Smoothing capacitor C1 is connected between line LN1B and negative bus LN1C, and reduces the AC component contained in the DC voltage across line LN1B and negative bus LN1C.

The voltage conversion operation of converter CONV1 will be described hereinafter. In the boost operation, control unit 2 (FIG. 1) maintains transistor Q1A at the ON state, and turns on/off transistor Q1B at a prescribed duty ratio. During the ON period of transistor Q1B, a discharging current flows from power storage unit BAT1 to main positive bus MPL sequentially through line LN1B, inductor L1, transistor Q1A, and positive bus LN1A. At the same time, a pump current flows from power storage unit BAT1 sequentially through line LN1B, inductor L1, transistor Q1B, and negative bus LN1C. Inductor L1 accumulates electromagnetic energy by means of the pump current. Successively, when transistor Q1B makes transition from the ON state to the OFF state, inductor L1 superimposes the accumulated electromagnetic energy onto the discharging current. Consequently, the average voltage of the DC power supplied from converter CONV1 to main positive bus MPL and main negative bus MNL is boosted by a voltage corresponding to the electromagnetic energy accumulated in inductor L1 in accordance with the duty ratio.

As converter CONV2 is also configured and operates in the manner the same as converter CONV1 described above, detailed description will not be repeated.

(One-Side Stop Mode)

Figure 3A:
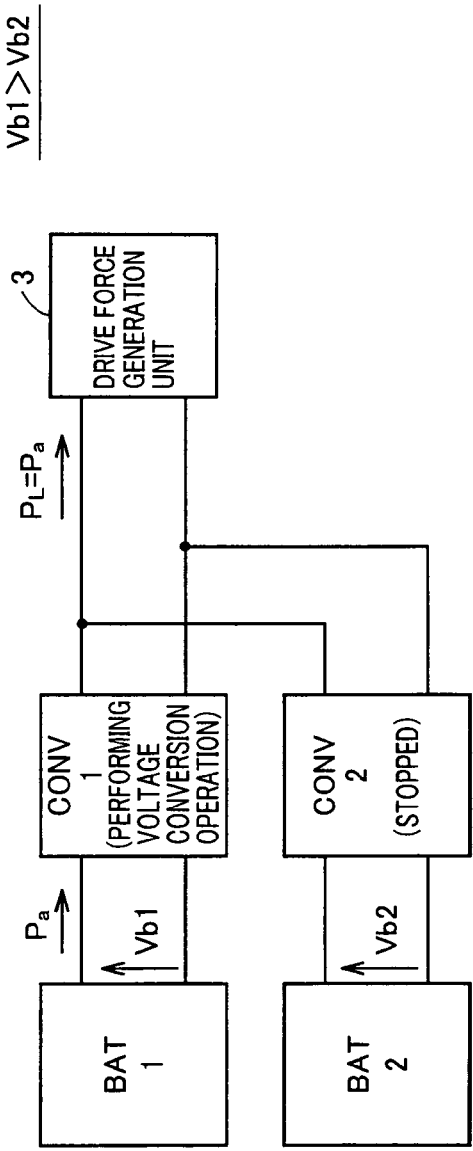
FIGS. 3A and 3B are schematic diagrams showing electric power supplied and received to and from a drive force generation unit in a one-side stop mode.
Figure 3B:
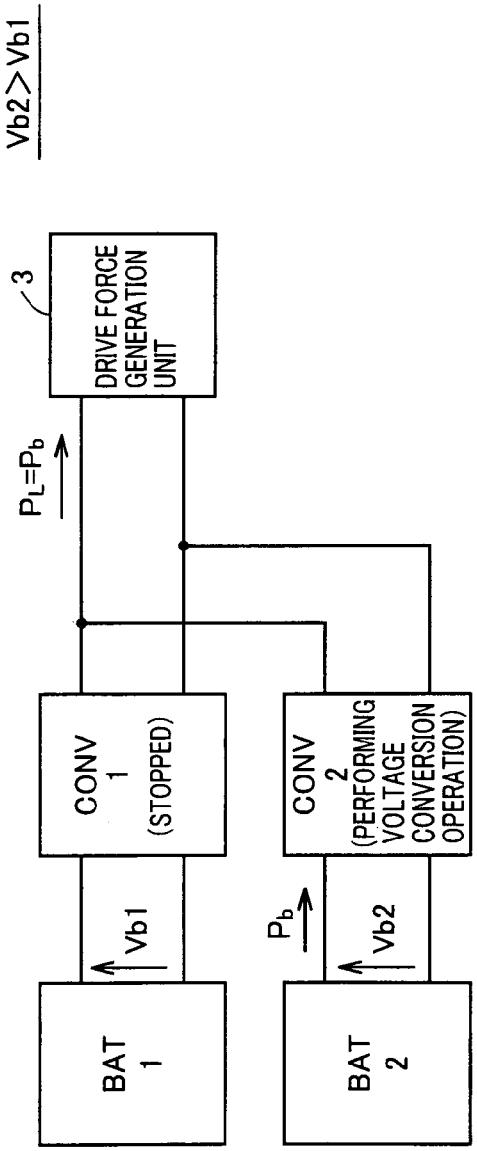

FIGS. 3A and 3B are schematic diagrams showing electric power supplied and received to and from drive force generation unit 3 in the one-side stop mode.

FIG. 3A shows an example where converter CONV1 is selected to perform the power conversion operation.

FIG. 3A shows an example where converter CONV2 is selected to perform the power conversion operation.

Referring to FIG. 3A, if output voltage Vb1 of power storage unit BAT1 is greater than output voltage Vb2 of power storage unit BAT2 immediately after transition to the one-side stop mode, converter CONV1 performs the voltage conversion operation and the voltage conversion operation of converter CONV2 is stopped. Then, drive force generation unit 3 is supplied with discharge power Pa from power storage unit BAT1 through converter CONV1.

On the other hand, referring to FIG. 3B, if output voltage Vb2 of power storage unit BAT2 is greater than output voltage Vb1 of power storage unit BAT1 immediately after transition to the one-side stop mode, converter CONV2 performs the voltage conversion operation and the voltage conversion operation of converter CONV1 is stopped. Then, drive force generation unit 3 is supplied with discharge power Pb from power storage unit BAT2 through converter CONV2.

As described above, in the one-side stop mode, as the voltage conversion operation of one of two converters CONV1, CONV2 is stopped, switching loss (power conversion loss) in chopper circuits 40A, 40B (FIG. 2) or the like can be decreased.

(Control Structure)

Figure 4:
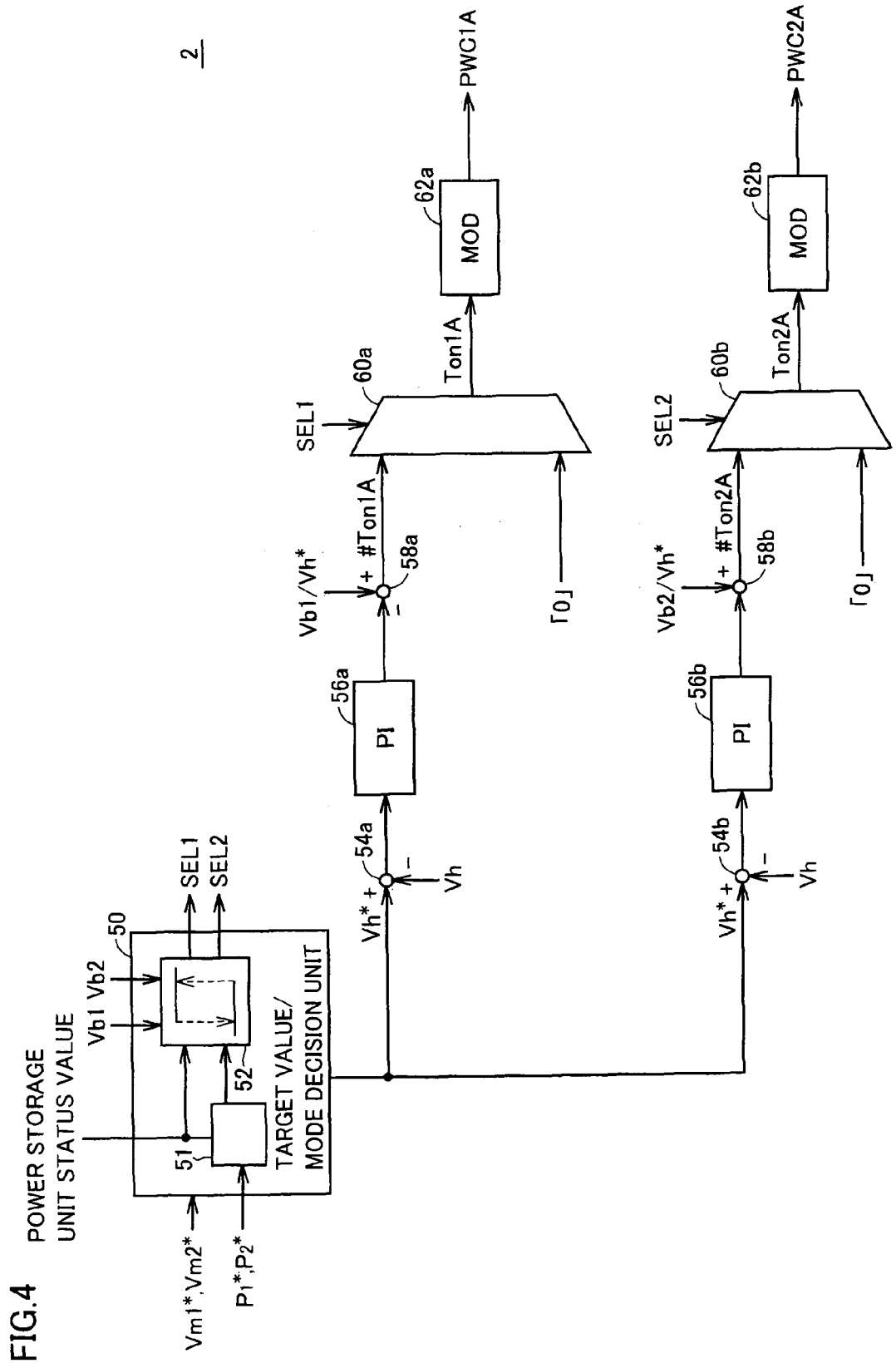
FIG. 4 is a block diagram showing a control structure in a control unit according to the embodiment of the present invention.

FIG. 4 is a block diagram showing a control structure in control unit 2 according to the embodiment of the present invention.

Referring to FIG. 4, the control structure according to the embodiment of the present invention generates switching instructions PWC1A, PWC2A for controlling the voltage conversion operation (boost operation) in converters CONV1, CONV2. The control structure according to the embodiment of the present invention includes a target value/mode decision unit 50, subtraction units 54a, 54b, 58a, 58b, proportional integral units (PI) 56a, 56b, selection units 60a, 60b, and modulation units (MOD) 62a, 62b.

Subtraction unit 54a and proportional integral unit 56a configure a voltage feedback control component for converter CONV1, and generate a control output such that supply voltage Vh across main positive bus MPL and main negative bus MNL matches with a target voltage Vh*. In addition, subtraction unit 58a configures a voltage feedforward control component for converter CONV1, compensates for a control output provided from proportional integral unit 56a, and generates a duty instruction #Ton1A (provisional value).

Selection unit 60a receives duty instruction #Ton1A (provisional value) and a "0" value, and outputs any one of these to modulation unit 62a as duty instruction Ton1A in response to selection instruction SEL1.

Modulation unit 62a generates switching instruction PWC1A based on comparison of a carrier wave generated by a not-shown oscillation unit with duty instruction Ton1A, and provides the same to converter CONV1. Therefore, when duty instruction #Ton1A (provisional value) is output from selection unit 60a as duty instruction Ton1A, converter CONV1 performs the voltage conversion operation. On the other hand, when the "0" value is output from selection unit 60a, the voltage conversion operation of converter CONV1 is stopped.

Similarly, subtraction unit 54b and proportional integral unit 56b configure a voltage feedback control component for converter CONV2, and generate a control output such that supply voltage Vh across main positive bus MPL and main negative bus MNL matches with target voltage Vh*. In addition, subtraction unit 58b configures a voltage feedforward control component for converter CONV2, compensates for a control output provided from proportional integral unit 56b, and generates a duty instruction #Ton2A (provisional value).

Selection unit 60b receives duty instruction #Ton2A (provisional value) and a "0" value, and outputs any one of these to modulation unit 62b as duty instruction Ton2A in response to selection instruction SEL2.

Modulation unit 62b generates switching instruction PWC2A based on comparison of a carrier wave generated by a not-shown oscillation unit with duty instruction Ton2A, and provides the same to converter CONV2. Therefore, when duty instruction #Ton2A (provisional value) is output from selection unit 60b as duty instruction Ton2A, converter CONV2 performs the voltage conversion operation. On the other hand, when the "0" value is output from selection unit 60b, the voltage conversion operation of converter CONV2 is stopped.

It is noted that proportional integral units 56a, 56b are each configured to include at least a proportional element (P) and an integral element (I), and output a control output in accordance with deviation between target voltage Vh* and supply voltage Vh based on prescribed gain and time constant.

Target value/mode decision unit 50 decides target voltage Vh* in accordance with voltage request Vm1*, Vm2* received from HV_ECU 4 and outputs the same to subtraction unit 54a, 54b. In addition, target value/mode decision unit 50 includes a one-side stop mode determination unit 51 and a hysteresis characteristic unit 52.

One-side stop mode determination unit 51 determines whether the one-side stop mode should be selected or not, based on electric power request P1*, P2* from drive force generation unit 3. When one-side stop mode determination unit 51 determines that the one-side stop mode should be selected, one-side stop mode determination unit 51 outputs such a signal to hysteresis characteristic unit 52.

When hysteresis characteristic unit 52 receives the signal indicating selection of the one-side stop mode from one-side stop mode determination unit 51, hysteresis characteristic unit 52 selects, as initial selection, the converter corresponding to the power storage unit greater in the output voltage. Then, hysteresis characteristic unit 52 outputs only any one of SEL1, SEL2 corresponding to the selected converter.

In addition, hysteresis characteristic unit 52 switches between selection instructions SEL1, SEL2 in accordance with the hysteresis characteristic defined by the prescribed switching threshold voltage. Namely, hysteresis characteristic unit 52 switches between selection instructions SEL1, SEL2 at a time point when a voltage difference between output voltage Vb1 and output voltage Vb2 is equal to or greater than the switching threshold voltage. Moreover, hysteresis characteristic unit 52 decides the switching threshold voltage in accordance with the status value of power storage unit BAT1, BAT2 associated with the degree of fluctuation in output voltage Vb1, Vb2.

(Hysteresis Characteristic)

Figure 5:
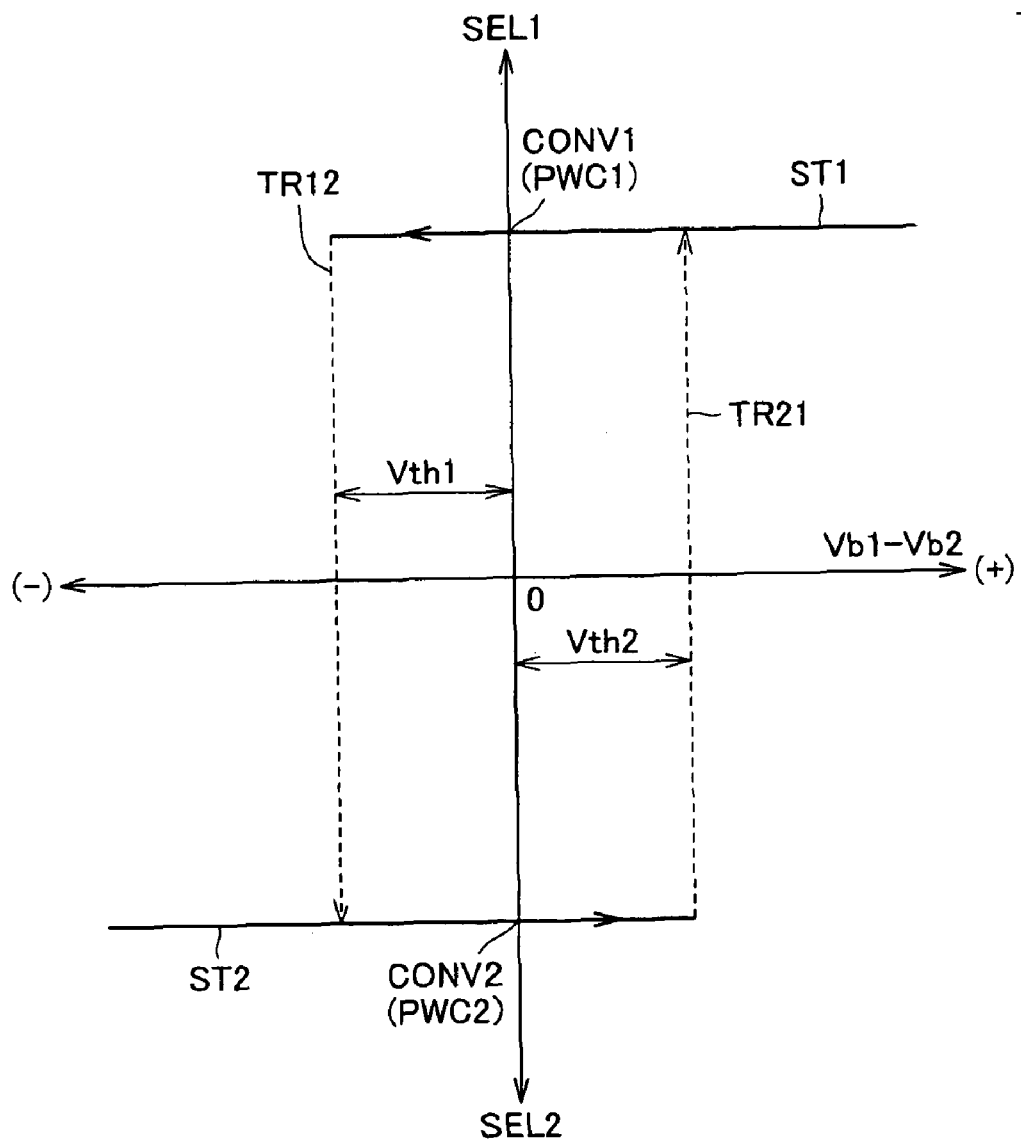
FIG. 5 is a diagram for illustrating in detail an operation of a hysteresis characteristic unit.

FIG. 5 is a diagram for illustrating in detail an operation of hysteresis characteristic unit 52.

Referring to FIG. 5, hysteresis characteristic unit 52 switches between outputs of selection instructions SEL1, SEL2 in accordance with the voltage difference between output voltage Vb1 and output voltage Vb2. Specifically, hysteresis characteristic unit 52 switches between the outputs of selection instructions SEL1, SEL2 in accordance with status characteristics ST1 and ST2 dependent on a present selection state (history). That is, if selection instruction SEL1 has been selected, hysteresis characteristic unit 52 makes determination of switching in accordance with status characteristic ST1, and if selection instruction SEL2 has been selected, hysteresis characteristic unit 52 makes determination of switching in accordance with status characteristic ST2.

Therefore, even when output voltage Vb1 of power storage unit BAT1 is slightly lower than output voltage Vb2 of power storage unit BAT2, hysteresis characteristic unit 52 maintains selection of selection instruction SEL1. If output voltage Vb1 is lower than output voltage Vb2 by an amount exceeding a first switching threshold voltage Vth1, hysteresis characteristic unit 52 switches from selection instruction SEL1 to selection instruction SEL2 and outputs the resultant instruction (transition characteristic TR12).

Similarly, even when output voltage Vb2 of power storage unit BAT2 is slightly lower than output voltage Vb1 of power storage unit BAT1, hysteresis characteristic unit 52 maintains selection of selection instruction SEL2. If output voltage Vb2 is lower than output voltage Vb1 by an amount exceeding a second switching threshold voltage Vth2, hysteresis characteristic unit 52 switches from selection instruction SEL2 to selection instruction SEL1 and outputs the resultant instruction (transition characteristic TR21).

According to hysteresis characteristic unit 52 described above, so long as fluctuation in the voltage difference between output voltage Vb1 and output voltage Vb2 is within a range from switching threshold voltage Vth1 on (−) side to switching threshold voltage Vth2 on (+) side, switching between selection instructions SEL1 and SEL2 is not made but the selection instruction that is currently selected (that is, selection of the converter to be allowed to perform the voltage conversion operation) is maintained.

Figure 6A:
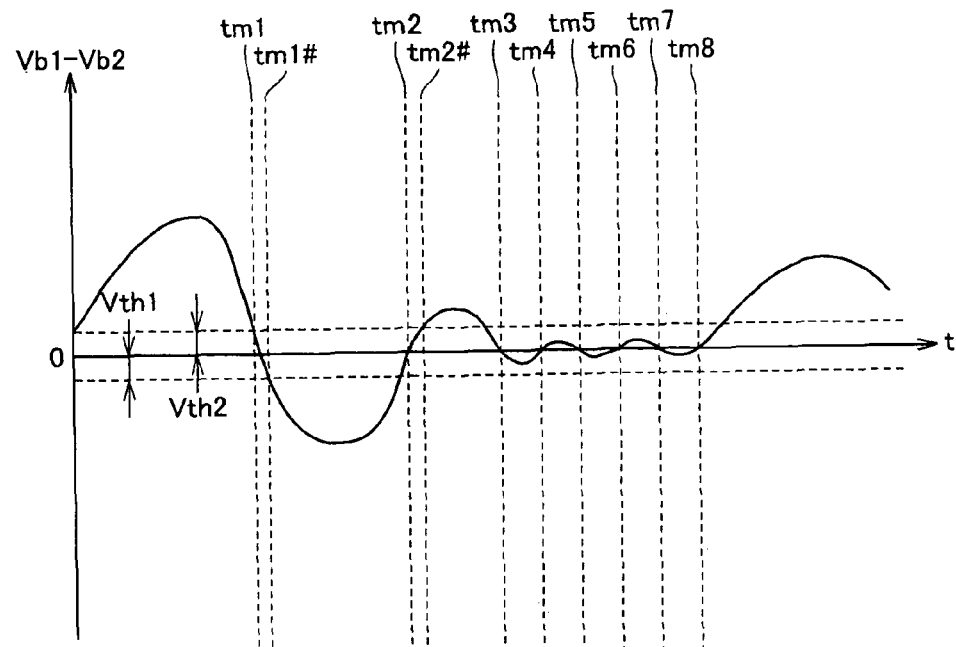
FIGS. 6A to 6C are diagrams for illustrating an example of the one-side stop mode executed by using the hysteresis characteristic unit according to the embodiment of the present invention.
Figure 6B:
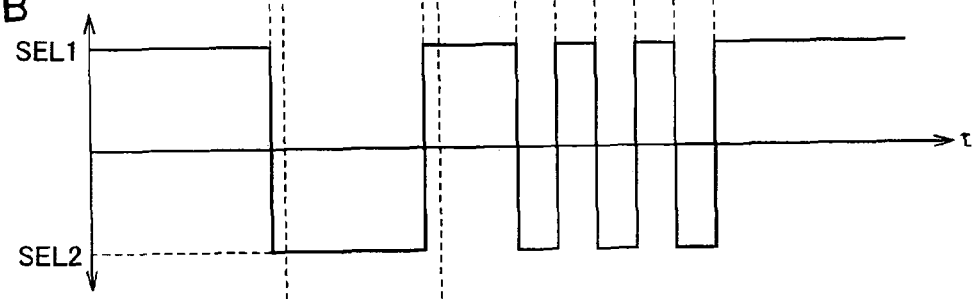
Figure 6C:
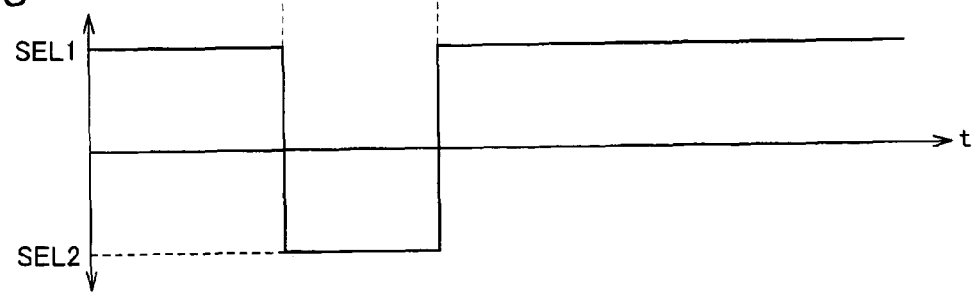

FIGS. 6A to 6C are diagrams for illustrating an example of the one-side stop mode executed by using hysteresis characteristic unit 52 according to the embodiment of the present invention.

FIG. 6A shows change over time of the voltage difference between output voltage Vb1 and output voltage Vb2.

FIG. 6B shows change over time of the selection instruction according to one embodiment of the related art.

FIG. 6C shows change over time of the selection instruction output from hysteresis characteristic unit 52 according to the embodiment of the present invention.

Referring, for example, to change over time of the voltage difference between output voltage Vb1 and output voltage Vb2 (Vb1-Vb2) as shown in FIG. 6A, times when the voltage difference between output voltage Vb1 and output voltage Vb2 crosses zero are times tm1 to tm8.

Referring to FIG. 6B, according to one embodiment of the related art, an output selection instruction is switched at each of times tm1 to tm8 shown in FIG. 6A. Consequently, the selection instruction is switched eight times in total during a period from time tm1 to tm8. In particular, it can be seen that the selection instruction is frequently switched during a period from time tm3 to tm8.

Referring to FIG. 6C, hysteresis characteristic unit 52 according to the first embodiment of the present invention makes switching between the selection instructions in accordance with the hysteresis characteristic defined by switching threshold voltages Vth1 and Vt2. Accordingly, at time tm1 when the voltage difference between output voltage Vb1 and output voltage Vb2 crosses zero, switching from selection instruction SEL1 to SEL2 is not made. Thereafter, switching from selection instruction SEL1 to selection instruction SEL2 is not made until time tm1# when the voltage difference between output voltage Vb1 and output voltage Vb2 attains to switching threshold voltage Vth1.

Similarly, switching from selection instruction SEL2 to selection instruction SEL1 is made at time tm2# when the voltage difference between output voltage Vb1 and output voltage Vb2 attains to switching threshold voltage Vth2.

In addition, during the period from time tm3 to tm8, as the voltage difference between output voltage Vb1 and output voltage Vb2 fluctuates only within a range from switching threshold voltage Vth1 to Vth2, switching between the selection instructions is not made but selection instruction SEL1 is still output.

Thus, according to hysteresis characteristic unit 52 according to the first embodiment of the present invention, frequent switching between the selection instructions can be suppressed. Therefore, in the one-side stop mode, supply voltage to drive force generation unit 3 and the voltage conversion operation in converter CONV1, CONV2 can be stabilized.

(Decision of Switching Threshold Voltage)

Change over time in the voltage difference between output voltage Vb1 and output voltage Vb2 as shown in FIG. 6A above is greatly affected by the degree of fluctuation in output voltage Vb1, Vb2 of power storage unit BAT1, BAT2. Namely, if the degree of fluctuation in output voltage Vb1, Vb2 is great, the voltage difference between output voltage Vb1 and output voltage Vb2 also fluctuates to a large extent. Therefore, if the degree of fluctuation in output voltage Vb1, Vb2 is great, it is desirable to suppress frequency in switching between the converters that should perform the power conversion operation, by making switching threshold voltage Vth1, Vth2 greater.

Here, hysteresis characteristic unit 52 according to the embodiment of the present invention decides switching threshold voltage Vth1, Vth2 in accordance with the status value associated with the degree of fluctuation in output voltage Vb1, Vb2 of power storage unit BAT1, BAT2. Hysteresis characteristic unit 52 uses power storage unit temperature Tb1, Tb2, output current Ib1, Ib2, the internal resistance of power storage unit BAT1, BAT2, a degree of deterioration of power storage unit BAT1, BAT2, remaining capacity SOC of power storage unit BAT1, BAT2, and the like as the status value deciding such switching threshold voltage Vth1, Vth2. Each status value will be described hereinafter in detail.

In the description below, power storage units BAT1, BAT2, power storage unit temperatures Tb1, Tb2, output currents Ib1, Ib2, output voltages Vb1, Vb2, and switching threshold voltages Vth1, Vth2 are also collectively simply referred to as "power storage unit BAT," "power storage unit temperature Tb," "output current Ib", "output voltage Vb", and "switching threshold voltage Vth," respectively.

(Relation with Power Storage Unit Temperature and Output Current)

Figure 7:
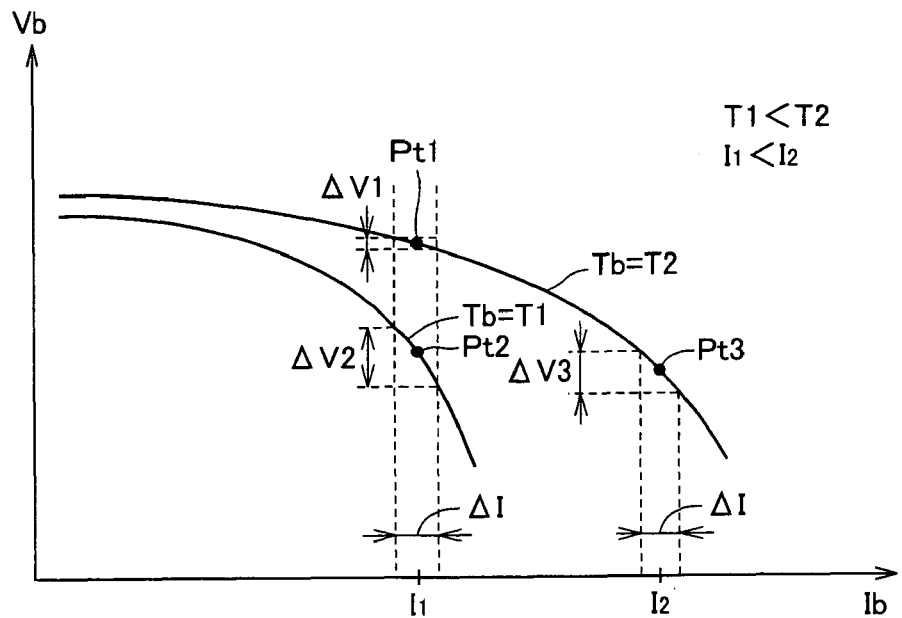
FIG. 7 is a diagram for illustrating relation of a degree of fluctuation in an output voltage of a power storage unit with a power storage unit temperature and an output current.

FIG. 7 is a diagram for illustrating relation of a degree of fluctuation in output voltage Vb of power storage unit BAT with power storage unit temperature Tb and output current Ib.

Referring to FIG. 7, in an example where power storage unit temperature Tb is assumed as T1 and T2 (T1<T2), two Ib-Vb characteristics showing variation in output voltage Vb relative to output current Ib are shown.

In these Ib-Vb characteristics, comparison of voltage fluctuation at two points Pt1 (Tb=T2) and Pt2 (Tb=T1) where output current Ib attains to I1 is made. At point Pt1, fluctuation in output voltage Vb relative to current fluctuation ΔI of output current Ib corresponds to voltage fluctuation ΔV1. On the other hand, at point Pt2, fluctuation in output voltage Vb relative to current fluctuation ΔI of output current Ib corresponds to voltage fluctuation ΔV2.

Here, as voltage fluctuation ΔV2>voltage fluctuation ΔV1, relation of (voltage fluctuation ΔV2/current fluctuation ΔI)>(voltage fluctuation ΔV1/current fluctuation ΔI) is satisfied. Namely, it indicates that, if output current Ib of power storage unit BAT fluctuates with fluctuation in electric power supplied and received to and from drive force generation unit 3 (FIG. 1), the degree of fluctuation in output voltage Vb of power storage unit BAT is greater as power storage unit temperature Tb is lower.

Therefore, from a point of view of further stabilization of the one-side stop mode, it is desirable to make switching threshold voltage Vth greater as power storage unit temperature Tb of power storage unit BAT is lower.

In addition, in the Ib-Vb characteristic when power storage unit temperature Tb=T2, comparison of voltage fluctuation at two points Pt1 and P3 where output current Ib attains to I1 and I2 is made. At point Pt1, fluctuation in output voltage Vb relative to current fluctuation ΔI of output current Ib corresponds to voltage fluctuation ΔV1. On the other hand, at point Pt3, fluctuation in output voltage Vb relative to the same current fluctuation ΔI corresponds to voltage fluctuation ΔV3.

Here, as voltage fluctuation ΔV3>voltage fluctuation ΔV1, relation of (voltage fluctuation ΔV3/current fluctuation ΔI)>(voltage fluctuation ΔV1/current fluctuation ΔI) is satisfied. Namely, it indicates that, if output current Ib of power storage unit BAT fluctuates with fluctuation in electric power supplied and received to and from drive force generation unit 3 (FIG. 1), the degree of fluctuation in output voltage Vb of power storage unit BAT is greater as the absolute value of output current Ib is greater.

Therefore, from a point of view of further stabilization of the one-side stop mode, it is desirable to make switching threshold voltage Vth greater as the absolute value of output current Ib of power storage unit BAT is greater.

Based on the characteristics as described above, hysteresis characteristic unit 52 (FIG. 4) stores in advance, for example, a map in which switching threshold voltage Vth1 is defined in correspondence with power storage unit temperature Tb and output current Ib. Then, hysteresis characteristic unit 52 changes switching threshold voltage Vth in accordance with power storage unit temperature Tb and/or output current Ib of at least one of power storage units BAT1, BAT2.

Figure 8:
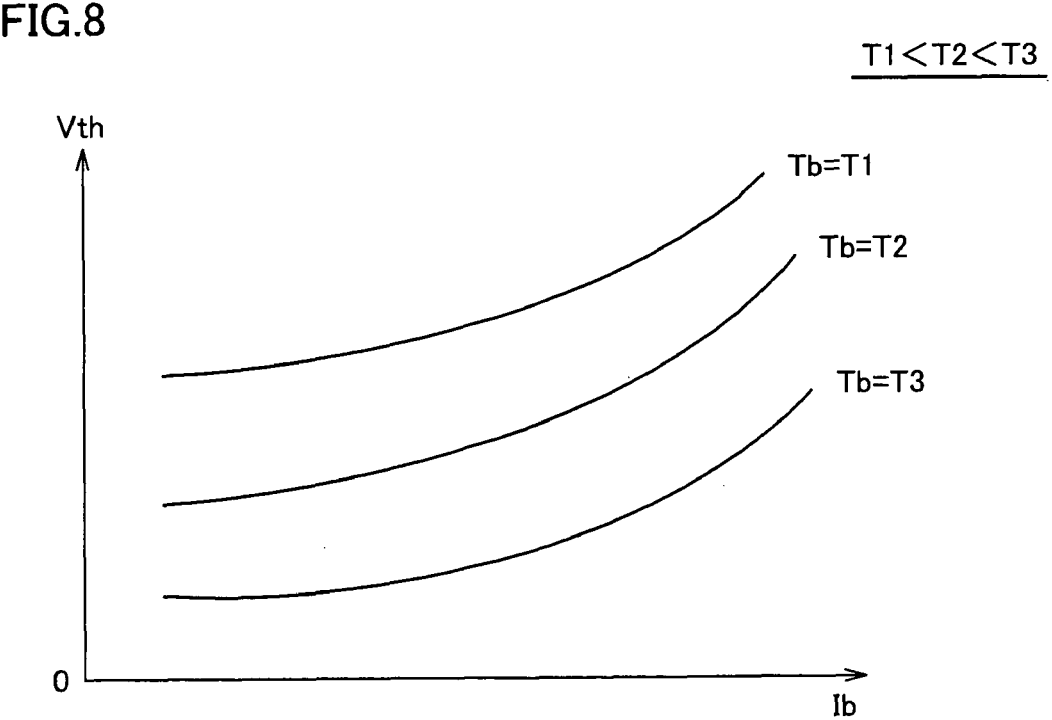
FIG. 8 is a diagram showing an exemplary map in which a switching threshold voltage is defined in correspondence with the power storage unit temperature and the output current.

FIG. 8 is a diagram showing an exemplary map in which switching threshold voltage Vth is defined in correspondence with power storage unit temperature Tb and output current Ib.

Referring to FIG. 8, switching threshold voltage Vth is set to a greater value as power storage unit temperature Tb is lower and/or output current Ib is greater.

(Relation with Internal Resistance of Power Storage Unit and Degree of Deterioration of Power Storage Unit)

Figure 9:
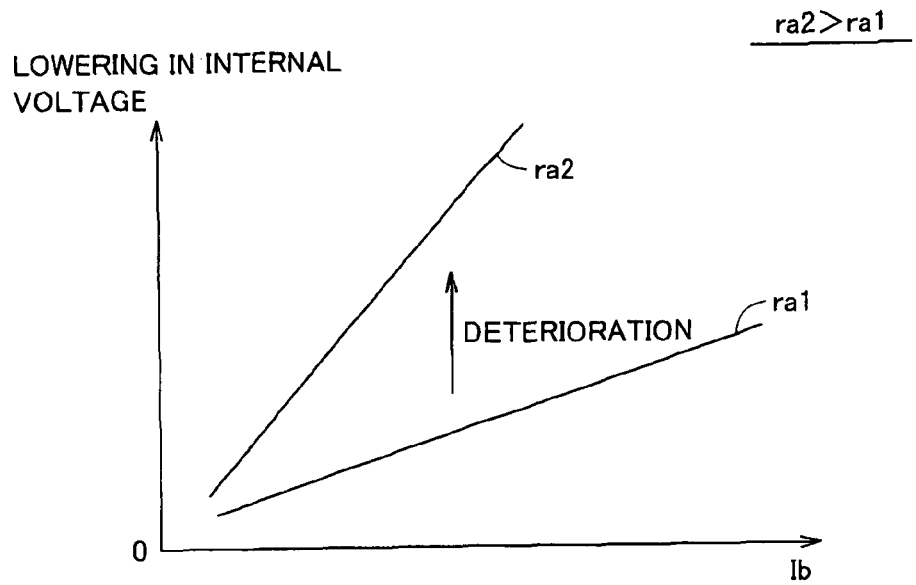
FIG. 9 is a diagram for illustrating relation of a degree of fluctuation in an output voltage of a power storage unit with an internal resistance of the power storage unit or a degree of deterioration of the power storage unit.

FIG. 9 is a diagram for illustrating relation of a degree of fluctuation in output voltage Vb of power storage unit BAT with an internal resistance of power storage unit BAT or a degree of deterioration of power storage unit BAT.

Referring to FIG. 9, power storage unit BAT has an internal resistance originating from a polarizing action or the like. Lowering in an internal voltage caused by output current Ib that flows through the internal resistance results in lowering in output voltage Vb of power storage unit BAT. Such lowering in the internal voltage is proportional to the product of the internal resistance and output current Ib. Therefore, as the internal resistance or output current Ib is greater, the degree of fluctuation in output voltage Vb of power storage unit BAT is greater.

In addition, the internal resistance tends to increase depending on the degree of deterioration of power storage unit BAT. For example, assuming that power storage unit BAT that had an internal resistance ra1 before deterioration deteriorates and the internal resistance thereof increases to ra2, lowering in the internal voltage also becomes greater. Therefore, the degree of deterioration of power storage unit BAT is associated with magnitude of the internal resistance of power storage unit BAT, that is, the degree of fluctuation in output voltage Vb of power storage unit BAT.

Therefore, from a point of view of further stabilization of the one-side stop mode, it is desirable to make switching threshold voltage Vth greater as the internal resistance of power storage unit BAT or the degree of deterioration of power storage unit BAT is greater.

Based on the characteristics as described above, hysteresis characteristic unit 52 (FIG. 4) stores in advance, for example, a map in which switching threshold voltage Vth is defined in correspondence with the internal resistance of power storage unit BAT or the degree of deterioration of power storage unit BAT. Then, hysteresis characteristic unit 52 changes switching threshold voltage Vth in accordance with the internal resistance or the degree of deterioration of at least one of power storage units BAT1, BAT2.

Figure 10:
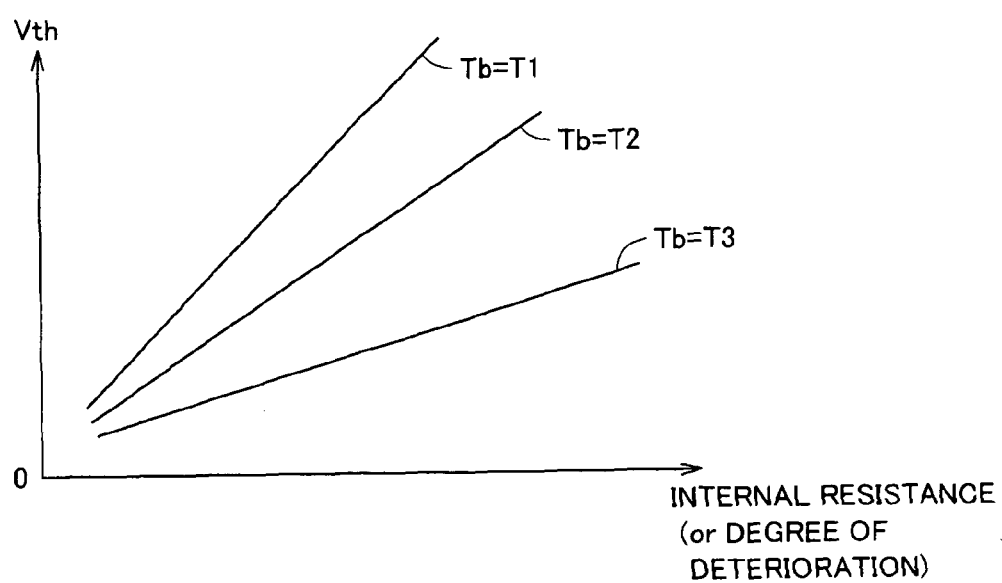
FIG. 10 is a diagram showing an exemplary map in which a switching threshold voltage is defined in correspondence with the internal resistance of the power storage unit or the degree of deterioration of the power storage unit.

FIG. 10 is a diagram showing an exemplary map in which switching threshold voltage Vth is defined in correspondence with the internal resistance of power storage unit BAT or the degree of deterioration of power storage unit BAT.

Referring to FIG. 10, as the internal resistance of power storage unit BAT or the degree of deterioration of power storage unit BAT is greater, switching threshold voltage Vth is decided on a greater value. In addition, as power storage unit temperature Tb is lower, switching threshold voltage Vth is decided on a greater value.

Various well-known means can be used as a method of measuring an internal resistance of power storage unit BAT. For example, the internal resistance can be measured by plotting output voltage Vb and output current Ib of power storage unit BAT and finding inclination obtained as variation in output voltage Vb relative to output current Ib.

In addition, various well-known means can be used as a method of measuring the degree of deterioration of power storage unit BAT. For example, the degree of deterioration (a percentage of decrease in a full charge capacity) can be measured based on the full charge capacity estimated based on an amount of charges (electric power) required for output voltage Vb of power storage unit BAT to experience prescribed voltage variation.

(Relation with Remaining Capacity of Power Storage Unit and Degree of Deterioration of Power Storage Unit)

Figure 11:
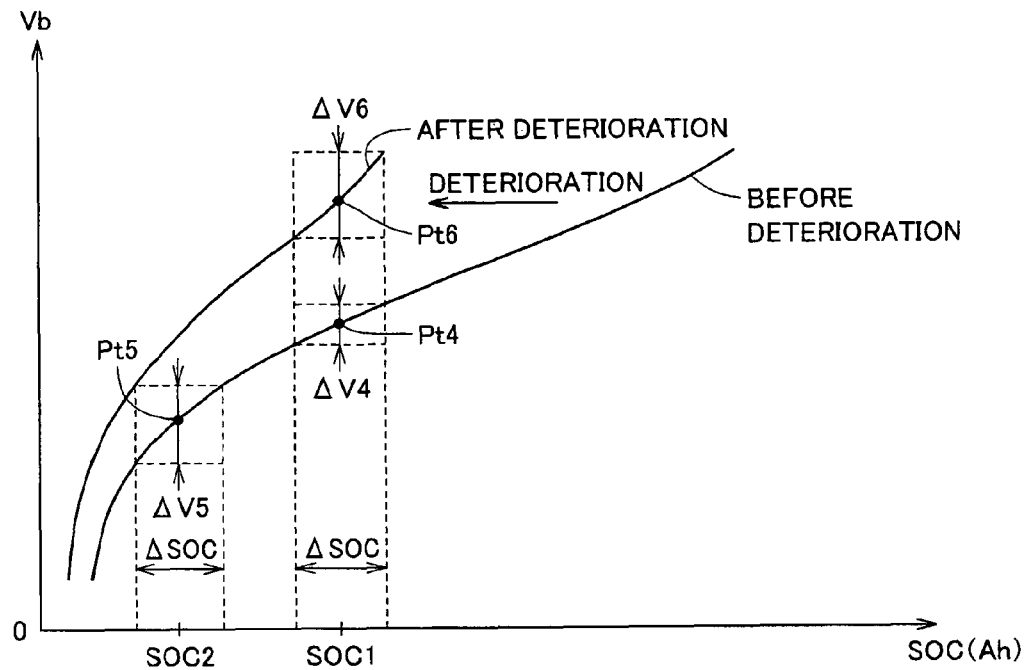
FIG. 11 is a diagram for illustrating relation of a degree of fluctuation in an output voltage of a power storage unit with a remaining capacity of the power storage unit and a degree of deterioration of the power storage unit.

FIG. 11 is a diagram for illustrating relation of a degree of fluctuation in output voltage Vb of power storage unit BAT with remaining capacity SOC of power storage unit BAT and a degree of deterioration of power storage unit BAT.

Referring to FIG. 11, two SOC-Vb characteristics defining relation of output voltage Vb with remaining capacity SOC before and after deterioration of power storage unit BAT are shown.

In the SOC-Vb characteristic (before deterioration), comparison of voltage fluctuation at two points Pt4 and P5 where remaining capacity SOC attains to SOC1 and SOC2 is made. At point Pt4, fluctuation in output voltage Vb relative to remaining capacity fluctuation ΔSOC in remaining capacity SOC corresponds to voltage fluctuation ΔV4. On the other hand, at point Pt5, fluctuation in output voltage Vb relative to the same remaining capacity fluctuation ΔSOC corresponds to voltage fluctuation ΔV5.

Here, as voltage fluctuation ΔV4<voltage fluctuation ΔV5, relation of (voltage fluctuation ΔV4/remaining capacity fluctuation ΔSOC)<(voltage fluctuation ΔV5/remaining capacity fluctuation ΔSOC) is satisfied. Namely, it indicates that, if remaining capacity SOC of power storage unit BAT is lowered over time with supply of electric power to drive force generation unit 3 (FIG. 1), the degree of fluctuation in output voltage Vb is greater as the absolute value of remaining capacity SOC is smaller.

In addition, when the absolute value of remaining capacity SOC of power storage unit BAT is close to the full charge capacity as well, the degree of fluctuation in output voltage Vb of power storage unit BAT is greater.

Therefore, from a point of view of further stabilization of the one-side stop mode, it is desirable to change switching threshold voltage Vth in accordance with the absolute value of remaining capacity SOC.

In addition, in the SOC-Vb characteristic (before deterioration) and the SOC-Vb characteristic (after deterioration), comparison of voltage fluctuation at two points Pt4 and P6 where remaining capacity SOC attains to SOC1 is made. At point Pt4, fluctuation in output voltage Vb relative to remaining capacity fluctuation ΔSOC in remaining capacity SOC corresponds to voltage fluctuation ΔV4. On the other hand, at point Pt6, fluctuation in output voltage Vb relative to remaining capacity fluctuation ΔSOC of remaining capacity SOC corresponds to voltage fluctuation ΔV6.

Here, as voltage fluctuation ΔV6>voltage fluctuation ΔV4, relation of (voltage fluctuation ΔV6/remaining capacity fluctuation ΔSOC)>(voltage fluctuation ΔV4/remaining capacity fluctuation ΔSOC) is satisfied. Namely, it indicates that, if output current Ib of power storage unit BAT fluctuates with fluctuation in electric power supplied and received to and from drive force generation unit 3 (FIG. 1), the degree of fluctuation in output voltage Vb of power storage unit BAT is greater as the degree of deterioration of power storage unit BAT is greater.

Therefore, from a point of view of further stabilization of the one-side stop mode, it is desirable to make switching threshold voltage Vth greater as the degree of deterioration of power storage unit BAT is greater.

Based on the characteristics as described above, hysteresis characteristic unit 52 (FIG. 4) stores in advance, for example, a map in which switching threshold voltage Vth is defined in correspondence with remaining capacity SOC of power storage unit BAT and the degree of deterioration of power storage unit BAT. Then, hysteresis characteristic unit 52 changes switching threshold voltage Vth in accordance with remaining capacity SOC and the degree of deterioration of at least one of power storage units BAT1, BAT2.

Figure 12:
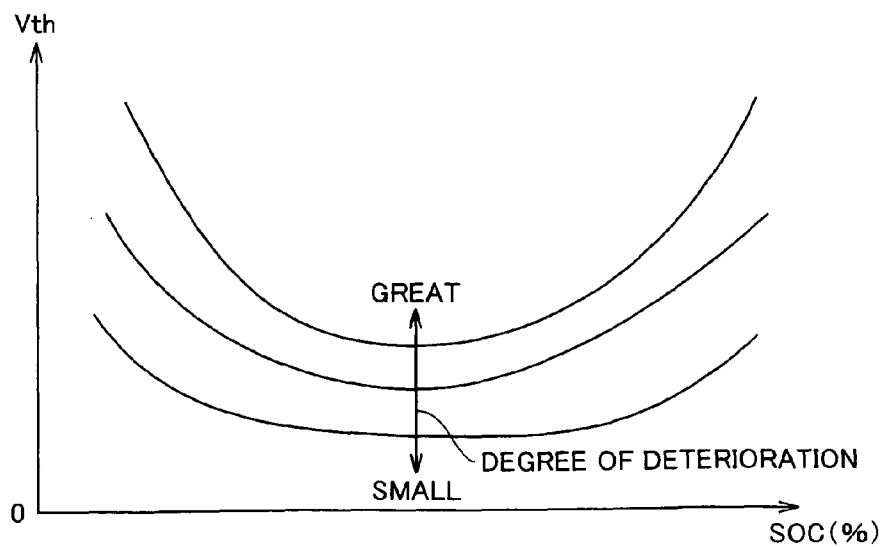
FIG. 12 is a diagram showing an exemplary map in which a switching threshold voltage is defined in correspondence with the remaining capacity of the power storage unit and the degree of deterioration of the power storage unit.

FIG. 12 is a diagram showing an exemplary map in which switching threshold voltage Vth is defined in correspondence with remaining capacity SOC of power storage unit BAT and the degree of deterioration of power storage unit BAT.

Referring to FIG. 12, as remaining capacity SOC of power storage unit BAT is close to a median value, switching threshold voltage Vth is decided on a smaller value. In addition, as the degree of deterioration of power storage unit BAT is greater, switching threshold voltage Vth is decided on a greater value.

Here, various well-known means can be used as a method of measuring remaining capacity SOC of power storage unit BAT. For example, SOC can successively be detected by adding provisional SOC calculated based on output voltage Vb generated when power storage unit BAT is in an open-circuit state (open-circuit voltage value) to correction SOC calculated based on an integral of output current Ib.

In the description above, for the sake of convenience of illustration, relation of the degree of fluctuation in output voltage Vb with three cases of combination of power storage unit temperature Tb and output current Ib, combination of the internal resistance of power storage unit BAT and the degree of deterioration of power storage unit BAT, and combination of remaining capacity SOC of power storage unit BAT and the degree of deterioration of power storage unit BAT has been illustrated, however, the present invention is not limited as such. Namely, switching threshold voltage Vth can be decided based on any one status value or a plurality of any status values out of such status values as power storage unit temperature Tb, output current Ib, the internal resistance of power storage unit BAT, the degree of deterioration of power storage unit BAT, and remaining capacity SOC of power storage unit BAT.

In addition, switching threshold voltages Vth1 and Vth2 can be set independently of each other. For example, switching threshold voltage Vth1 used for determination of switching from converter CONV1 to converter CONV2 may be decided based only on the status value of power storage unit BAT1, whereas switching threshold voltage Vth2 may be decided based only on the status value of power storage unit BAT2.

Moreover, switching threshold voltages Vth1 and Vth2 may be decided by multiplying the provisional value of the switching threshold voltage decided based on the status value of power storage unit BAT1 and the provisional value of the switching threshold voltage decided based on the status value of power storage unit BAT2 by prescribed weight coefficients respectively and by performing addition. Namely, switching threshold voltages Vth1 and Vth2 may be decided depending on the status values of power storage units BAT1 and BAT2, respectively.

According to the embodiment of the present invention, the one-side stop mode in which one converter out of the two converters is allowed to perform the voltage conversion operation and the voltage conversion operation of another converter is stopped is selected in accordance with the electric power request from the drive force generation unit. In this one-side stop mode, when the output voltage of the power storage unit corresponding to the converter being performing the voltage conversion operation is lower than the output voltage of the power storage unit corresponding to the converter of which voltage conversion operation has been stopped by an amount exceeding a prescribed threshold voltage, switching between the converters to be allowed to perform the voltage conversion operation is made. Thus, as compared with such a configuration that switching between the converters is made directly in accordance with magnitude of the output voltage of the power storage unit, too frequent switching operation between the converters is less likely. Therefore, the supply voltage to the load device or the control system involved with the voltage conversion operation can be prevented from becoming unstable, and stability in the one-side stop mode can be improved.

In addition, according to the embodiment of the present invention, the switching threshold voltage used for determination of switching between the converters is decided in association with the degree of fluctuation in the output voltage in the power storage unit. Thus, such circumstances in which switching between the converters is made too frequently or circumstances in which switching between the converters is not made, depending on the degree of fluctuation in the output voltage of the power storage unit, can be avoided. Therefore, determination of switching between the converters to perform the power conversion operation can be optimized.

(Variation)

The present invention is applicable also to a power supply system having three or more power storage units, in addition to the power supply system having two power storage units described above.

Figure 13:
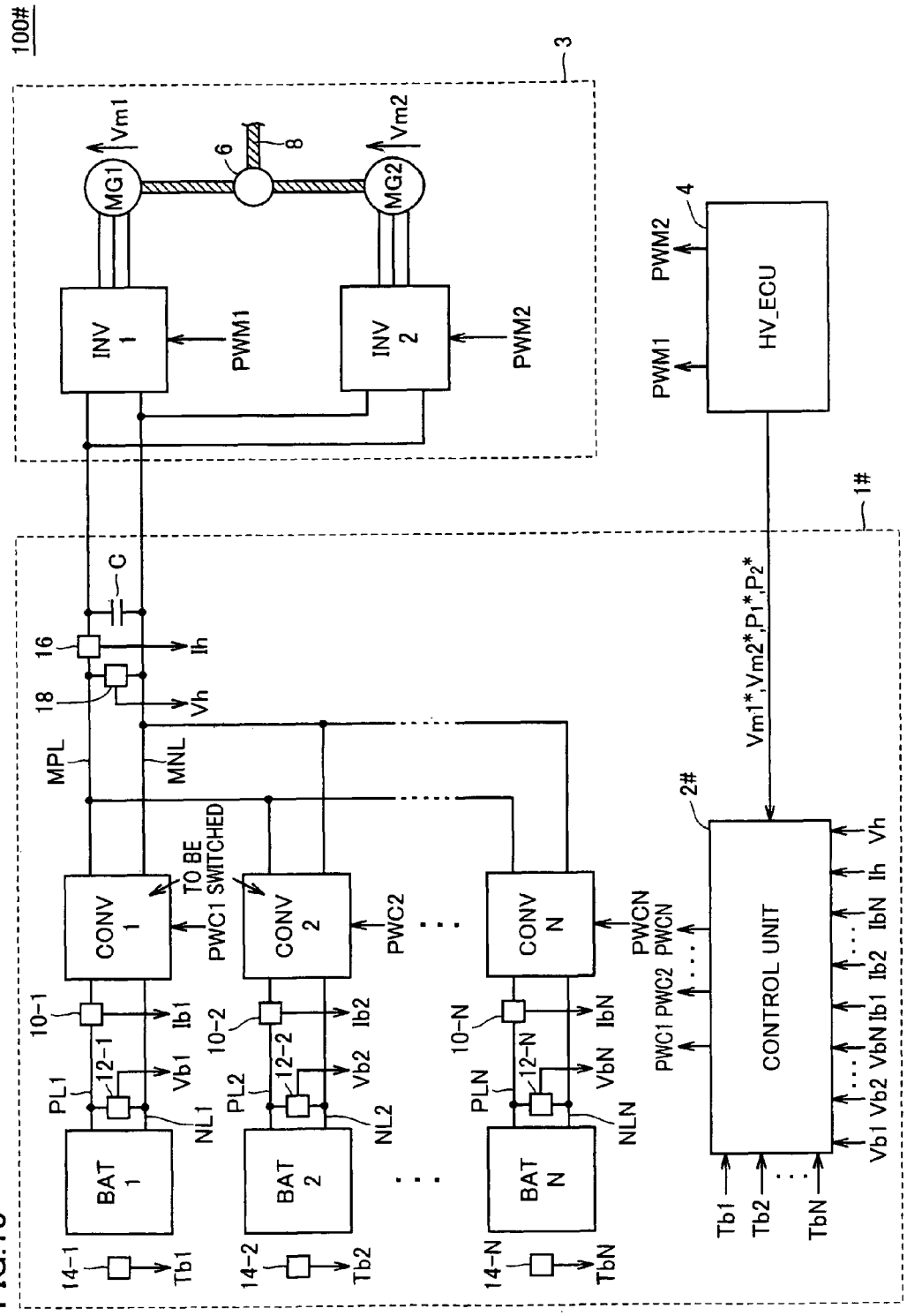
FIG. 13 is a schematic configuration diagram showing a substantial part of a vehicle including a power supply system according to a variation of the embodiment of the present invention.

FIG. 13 is a schematic configuration diagram showing a substantial part of a vehicle 100# including a power supply system 1# according to a variation of the embodiment of the present invention.

Referring to FIG. 13, as vehicle 100# includes a power supply system 1# arranged instead of power supply system 1 in vehicle 100 shown in FIG. 1, detailed description of drive force generation unit 3 will not be repeated. In the variation of the embodiment of the present invention, power supply system 1# including N power storage units will be described.

Power supply system 1# includes converters CONV1 to CONVN, power storage units BAT1 to BATN, output current detection units 10-1 to 10-N, output voltage detection units 12-1 to 12-N, and power-storage-unit-temperature detection units 14-1 to 14-N arranged instead of converters CONV1, CONV2, power storage units BAT1, BAT2, output current detection units 10-1, 10-2, output voltage detection units 12-1, 12-2, and power-storage-unit-temperature detection units 14-1, 14-2, and further includes a control unit 2# arranged instead of control unit 2 in power supply system 1 shown in FIG. 1.

Converters CONV1 to CONVN are connected in parallel to main positive bus MPL and main negative bus MNL, and perform the voltage conversion operation between the respective corresponding power storage units BAT1 to BATN and main positive bus MPL, main negative bus MNL.

Power storage units BAT1 to BATN are connected in parallel to main positive bus MPL and main negative bus MNL with converters CONV1 to CONVN being interposed respectively.

Output current detection units 10-1 to 10-N, output voltage detection units 12-1 to 12-N, and power-storage-unit-temperature detection units 14-1 to 14-N are arranged in correspondence with power storage units BAT1 to BATN respectively.

Control unit 2# is configured to be able to execute the one-side stop mode with respect to two specific converters (for example, converters CONV1 and CONV2) out of converters CONV1 to CONVN. Namely, when the electric power request from drive force generation unit 3 is lowered by an amount comparable to the allowable charge/discharge power of power storage unit BAT1 or BAT2, control unit 2# stops the voltage conversion operation of any one of converters CONV1 and CONV2 and allows remaining converter to continue the voltage conversion operation.

Thus, control unit 2# decreases loss in power conversion in converter CONV1 or CONV2 and meets a relatively large electric power request in drive force generation unit 3.

As the variation is otherwise the same as the embodiment of the present invention described above, detailed description will not be repeated.

In the variation of the embodiment of the present invention, drive force generation unit 3 corresponds to the "load device", main positive bus MPL and main negative bus MNL correspond to the "power line", and converters CONV1 to CONVN correspond to the "plurality of voltage conversion units."

According to the variation of the embodiment of the present invention, even if three or more converters and power storage units are included, an effect similar to that in the embodiment of the present invention can be achieved. Therefore, the number of converters and power storage units can relatively freely be designed, depending on the electric power request of the load device. Accordingly, the power supply system capable of supplying electric power to load devices of various sizes and types and the vehicle including the same can be realized.

In the embodiment of the present invention and the variation thereof, the configuration employing the drive force generation unit including two motor-generators has been described as an example of the load device, however, the number of motor-generators is not limited. In addition, the load device is not limited to the drive force generation unit generating the drive force of the vehicle, and any of a device solely consuming electric power and a device capable of both power consumption and power generation is also applicable.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system having a plurality of power storage units each configured to be capable of charge and discharge, comprising:

a power line configured to be capable of supplying and receiving electric power between a load device and said power supply system;

a plurality of voltage conversion units provided between respective ones of said plurality of power storage units and said power line, each performing a voltage conversion operation between a corresponding power storage unit and said power line;

an operation mode selection unit selecting an operation mode in which a voltage conversion operation of one voltage conversion unit out of first and second voltage conversion units included in said plurality of voltage conversion units is allowed and a voltage conversion operation of another voltage conversion unit is stopped, in accordance with an electric power request from said load device; and a voltage conversion unit selection unit selecting said one voltage conversion unit to be allowed to perform the voltage conversion operation based on output voltages of respective corresponding said power storage units, when said operation mode is selected, and said voltage conversion unit selection unit switching between said voltage conversion units to be allowed to perform the voltage conversion operation, when the output voltage of said power storage unit corresponding to said voltage conversion unit, which is performing the voltage conversion operation, is lower than the output voltage of said power storage unit corresponding to said voltage conversion unit of which voltage conversion operation has been stopped by an amount exceeding a prescribed threshold voltage, wherein said prescribed threshold voltage is decided in accordance with a status value associated with a degree of fluctuation in the output voltage of said power storage unit.

2. The power supply system according to claim 1, wherein said voltage conversion unit selection unit selects, as an initial selection in said operation mode, said voltage conversion unit corresponding to the power storage unit greater in the output voltage out of said respective corresponding power storage units.

3. The power supply system according to claim 1, wherein said prescribed threshold voltage is changed in accordance with a temperature of at least one of said power storage units corresponding to respective said first and second voltage conversion units.

4. The power supply system according to claim 1, wherein said prescribed threshold voltage is changed in accordance with an output current of said power storage unit corresponding to said voltage conversion unit performing the voltage conversion operation.

5. The power supply system according to claim 1, wherein said prescribed threshold voltage is changed in accordance with an internal resistance of at least one of said power storage units corresponding to respective said first and second voltage conversion units.

6. The power supply system according to claim 1, wherein said prescribed threshold voltage is changed in accordance with a degree of deterioration of at least one of said power storage units corresponding to respective said first and second voltage conversion units.

7. The power supply system according to claim 1, wherein said prescribed threshold voltage is changed in accordance with a remaining capacity of at least one of said power storage units corresponding to respective said first and second voltage conversion units.

8. The power supply system according to claim 1, wherein said prescribed threshold voltage includes a first prescribed threshold voltage used for determination of switching from said first voltage conversion unit to said second voltage conversion unit and a second prescribed threshold voltage used for determination of switching from said first voltage conversion unit to said second voltage conversion unit.

9. A vehicle, comprising:
a power supply system having a plurality of power storage units each configured to be capable of charge and discharge; and
a drive force generation unit generating drive force by receiving electric power supplied from said power supply system,
said power supply system including:
a power line configured to be capable of supplying and receiving electric power between said drive force generation unit and said power supply system,
a plurality of voltage conversion units provided between respective ones of said plurality of power storage units and said power line, each performing a voltage conversion operation between a corresponding power storage unit and said power line,
an operation mode selection unit selecting an operation mode in which a voltage conversion operation of one voltage conversion unit out of first and second voltage conversion units included in said plurality of voltage conversion units is allowed and a voltage conversion operation of another voltage conversion unit is stopped, in accordance with an electric power request from said drive force generation unit, and
a voltage conversion unit selection unit selecting said one voltage conversion unit to be allowed to perform the voltage conversion operation based on output voltages of respective corresponding said power storage units, when said operation mode is selected, and
said voltage conversion unit selection unit switching between said voltage conversion units to be allowed to perform the voltage conversion operation, when the output voltage of said power storage unit corresponding to said voltage conversion unit, which is performing the voltage conversion operation, is lower than the output voltage of said power storage unit corresponding to said voltage conversion unit of which voltage conversion operation has been stopped by an amount exceeding a prescribed threshold voltage,
wherein said prescribed threshold voltage is decided in accordance with a status value associated with a degree of fluctuation in the output voltage of said power storage unit.

10. The vehicle according to claim 9, wherein said voltage conversion unit selection unit selects, as an initial selection in said operation mode, said voltage conversion unit corresponding to the power storage unit greater in the output voltage out of said respective corresponding power storage units.

11. The vehicle according to claim 9, wherein said prescribed threshold voltage includes a first switching threshold voltage used for determination of switching from said first voltage conversion unit to said second voltage conversion unit and a second switching threshold voltage used for determination of switching from said first voltage conversion unit to said second voltage conversion unit.

* * * * *